United States Patent [19]
Dearnley

[11] 3,991,629
[45] Nov. 16, 1976

[54] POWER TAKE-OFF SHAFT ASSEMBLIES

[75] Inventor: Kenneth Dearnley, Huddersfield, England

[73] Assignee: David Brown Tractors Limited, Huddersfield, England

[22] Filed: Nov. 14, 1974

[21] Appl. No.: 523,927

[30] Foreign Application Priority Data
Dec. 17, 1973 United Kingdom............... 58305/73

[52] U.S. Cl....................................... 74/15.4; 64/6; 74/15.2; 403/359
[51] Int. Cl.²....................................... F16H 37/00
[58] Field of Search ............ 74/11, 15.2, 15.4, 15.8; 64/6, 4, 9; 403/359

[56] References Cited
UNITED STATES PATENTS

| | | | |
|---|---|---|---|
| 2,975,643 | 3/1961 | Ferguson | 74/15.2 |
| 3,279,275 | 10/1966 | Christie | 74/15.4 X |
| 3,513,712 | 5/1970 | Zajichek et al. | 74/15.4 X |
| 3,715,704 | 2/1973 | Boyle et al. | 74/15.4 |
| 3,830,111 | 8/1974 | Travaglio | 74/15.4 |

FOREIGN PATENTS OR APPLICATIONS

| | | | |
|---|---|---|---|
| 1,276,458 | 8/1968 | Germany | 74/15.4 |

Primary Examiner—Samuel Scott
Assistant Examiner—Randall Heald
Attorney, Agent, or Firm—Norris & Bateman

[57] ABSTRACT

A power take-off shaft assembly comprises a hollow drive shaft rotatable at one speed; a drive sleeve surrounding said shaft and rotatable simultaneously at another speed; a power take-off shaft with differently splined ends each adapted to fit within the drive shaft and with a central flange having an inner circle of equally spaced holes counterbored at one side of said flange and an outer circle of equally spaced holes counterbored at the other side thereof; and stepped bolts able to reach through said holes only from the counterbored ends thereof to secure the power take-off shaft to the drive shaft when fitted in said inner circle of holes whilst one end of the power take-off shaft projects operatively, and to secure the power take-off shaft to the sleeve when fitted in said outer circle of holes after turning said shaft end-for-end so that its other end projects operatively.

5 Claims, 4 Drawing Figures

POWER TAKE-OFF SHAFT ASSEMBLIES

BACKGROUND OF INVENTION

The invention relates to a power take-off shaft assembly, particularly but not exclusively for an agricultural tractor, of the kind in which a single power take-off shaft is rotatable at two different speeds and capable of presenting two appropriately different numbers of splines to equipment to be driven thereby. Existing standards require a six-splined power take-off shaft for rotation at 540 revolutions per minute and/or a twenty-one splined power take-off shaft for rotation at 1000 revolutions per minute.

SUMMARY OF INVENTION

According to the invention, a power take-off shaft assembly comprises a hollow drive shaft rotatable at a first speed; a drive sleeve surrounding the hollow drive shaft and rotatable simultaneously at a second speed; a power take-off shaft provided with differently splined end zones each of which is adapted to fit within the hollow drive shaft, and with a flange between said zones having an inner circle of equally spaced holes counterbored at one side of the flange and an outer circle of equally spaced holes counterbored at the other side of the flange; a set of stepped bolts adapted driveably to secure the power take-off shaft to the hollow drive shaft when passed through the inner circle of holes from said one side of the flange, so that the splined end zone of the power take-off shaft appropriate to the speed of the hollow drive shaft projects operatively, and adapted driveably to secure the power take-off shaft to the drive sleeve when passed through the outer circle of holes from said other side of the flange, the power take-off shaft having been turned end-for-end so that its splined end zone appropriate to the speed of the drive sleeve then projects operatively; and means for providing a clearance between the flange and that one of the hollow drive shaft and the drive sleeve to which the power take-off shaft is not for the time being driveably secured.

BRIEF DESCRIPTION OF DRAWINGS

A preferred embodiment of the invention will now be described, by way of example only, with reference to the accompanying drawings of which.

DESCRIPTION OF PREFERRED EMBODIMENT

Figure 4:
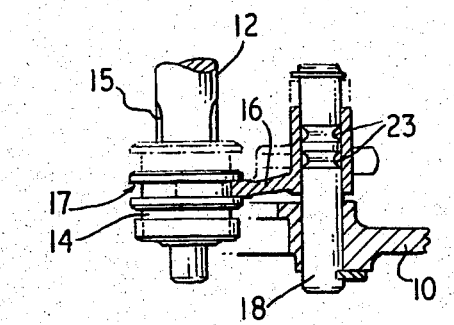
FIG. 4 is a section on the line 4—4 in FIG. 3.

Referring now to the drawings, the rear end of an agricultural tractor's combined chassis and transmission casing 10 houses a short countershaft 11 to which the rear end of a long, co-axial, power input shaft 12 is driveably connectible by a disengageable dog clutch indicated generally at 13. Said dog clutch comprises an externally toothed clutch sleeve 14 slideable on splines 15 at the rear end of the power input shaft 12 by a selector fork 16 engaging in an annular groove 17 in the sleeve 14 and slideable on a dead shaft 18 by a lever 19 welded to a short cross-shaft 20 on which a hand lever 21 is rigidly secured. The sleeve 14 is held selectively in engaged (see FIG. 4) or disengaged (see FIGS. 1 and 2) position by a spring-loaded ball 22 housed in the selector fork 16 and engaging in one of two annular grooves 23 formed in the dead shaft 18. The power input shaft 12 extends forwardly through the combined chassis and transmission casing 10, and at its front end is driveably connectible to the tractor's engine (not shown) by a disengageable friction clutch (not shown). Two gears 24, 25 of different pitch circle diameters are formed integrally on the countershaft 11. The larger one 24 of said gears meshes constantly with a gear 26 which is driveably secured on splines 27 near the front end of a short, hollow, drive shaft 28, and the smaller one 25 of the gears on the countershaft 11 meshes constantly with a gear 29 which is driveably secured on splines 30 at the front end of a drive sleeve 31 which co-axially surrounds, and is shorter than, the hollow drive shaft 28. The rear ends of the drive sleeve 31 and the hollow drive shaft 28 are flanged, and the rear faces of their respective flanges 32 and 33 lie in the same plane. The arrangement is such that the hollow drive shaft 28 is rotatable at a speed of 1000 revolutions per minute and the drive sleeve 31 is simultaneously rotatable at a speed of 540 revolutions per minute.

A power take-off shaft 34 has six splines formed on one end zone 35, 21 splines formed on its other end zone 36, and a flange 37 between said zones, the outside diameter of said flange being the same as that of the flange 32 on the drive sleeve 31. Each end zone of the power take-off shaft 34 is adapted to fit freely within the hollow drive shaft 28. The flange 37 on the power take-off shaft has an inner circle of four equally spaced holes 38 counterbored at that side of said flange adjacent the end zone 36, and an outer circle of four equally spaced holes 39 counterbored at the other side of said flange. The flange 37 on the power take-off shaft 34 also has an inner annular undercut 40 at that side of said flange adjacent the end zone 36, and an outer annular undercut 41 at said other side of said flange. A set of four bolts 42 which are stepped so as to mate with the counterbored holes 38 and 39 is provided to secure the power take-off shaft 34 driveably either to the hollow drive shaft 28 or to the drive sleeve 31, the flange 33 on the hollow drive shaft 28 being provided with threaded holes 43 aligned with the inner circle of holes 38 in the flange 37 on the power take-off shaft 34 and the flange 32 on the drive sleeve 31 being similarly provided with threaded holes 44 aligned with the outer circle of holes 39 in the flange 37 on the power take-off shaft 34. A conventional guard 45 for the power take-off shaft 34 is secured to the rear end of the combined chassis and transmission casing 10.

Figure 1:
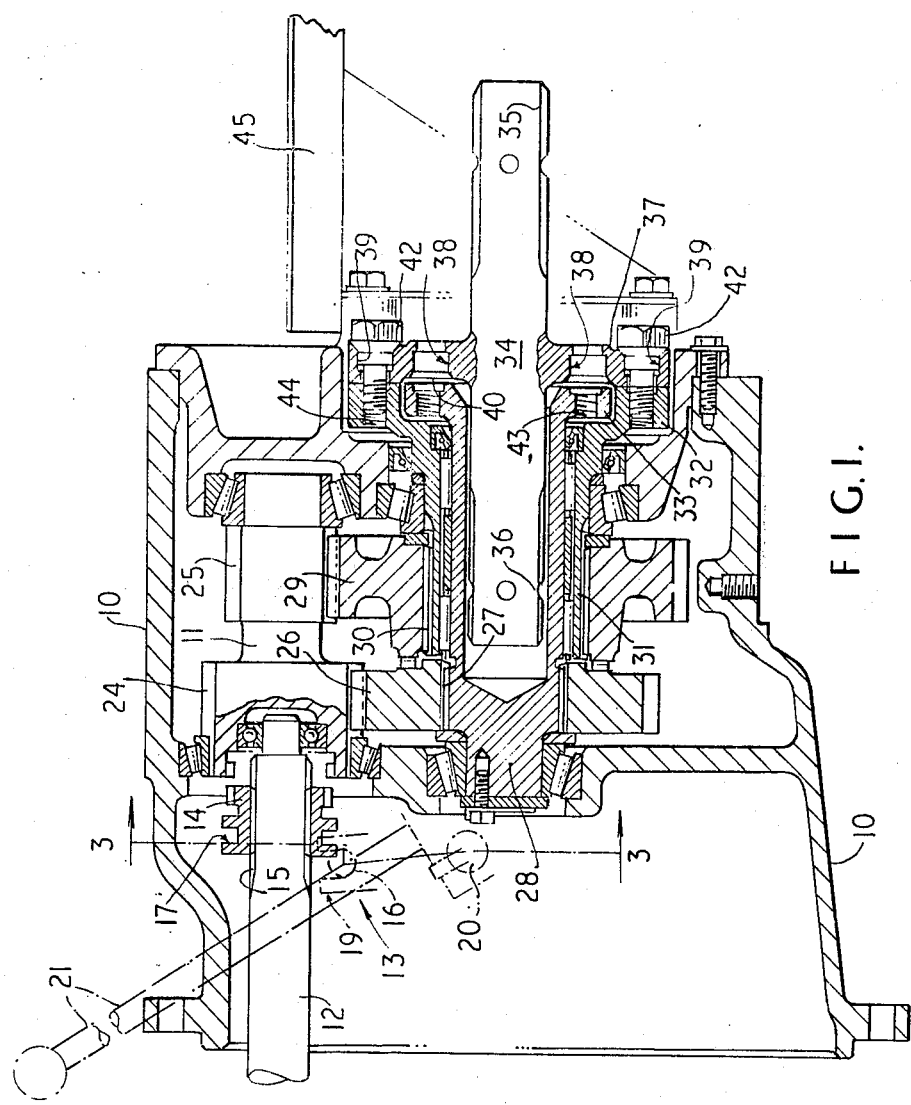
FIG. 1 is a sectional side elevation of the rear end of an agricultural tractor's combined chassis and transmission casing with a power take-off shaft arranged to rotate at 540 revolutions per minute and to present six splines to equipment to be driven thereby.

When the power take-off shaft 34 is required to rotate at a speed of 540 revolutions per minute with its six-splined end zone 35 projecting operatively, its other end zone 36 is inserted into the hollow drive shaft 28 and the set of stepped bolts 42 is passed through the outer circle of holes 39 in its flange 37 into engagement with the threaded holes 44 in the flange 32 on the drive sleeve 31 as shown in FIG. 1. The set of bolts 42 cannot be erroneously engaged in the threaded holes 43 in the flange 33 on the hollow drive shaft 28 as the counterbores in the inner circle of holes 38 in the flange 37 on the power take-off shaft 34 are for the time being disposed at the inaccessible side of the last-mentioned flange adjacent the flange 33 on the hollow drive shaft 28 and therefore the bolts 42, due to being stepped, cannot pass sufficiently far through said inner circle of holes 38 to engage in the threaded holes 43 aligned therewith. The inner annular undercut 40 provides an axial clearance between the flange 37 on the power take-off shaft 34 and the flange 33 on the hollow drive shaft 28 which is rotating simultaneously but at a faster speed.

Figure 2:
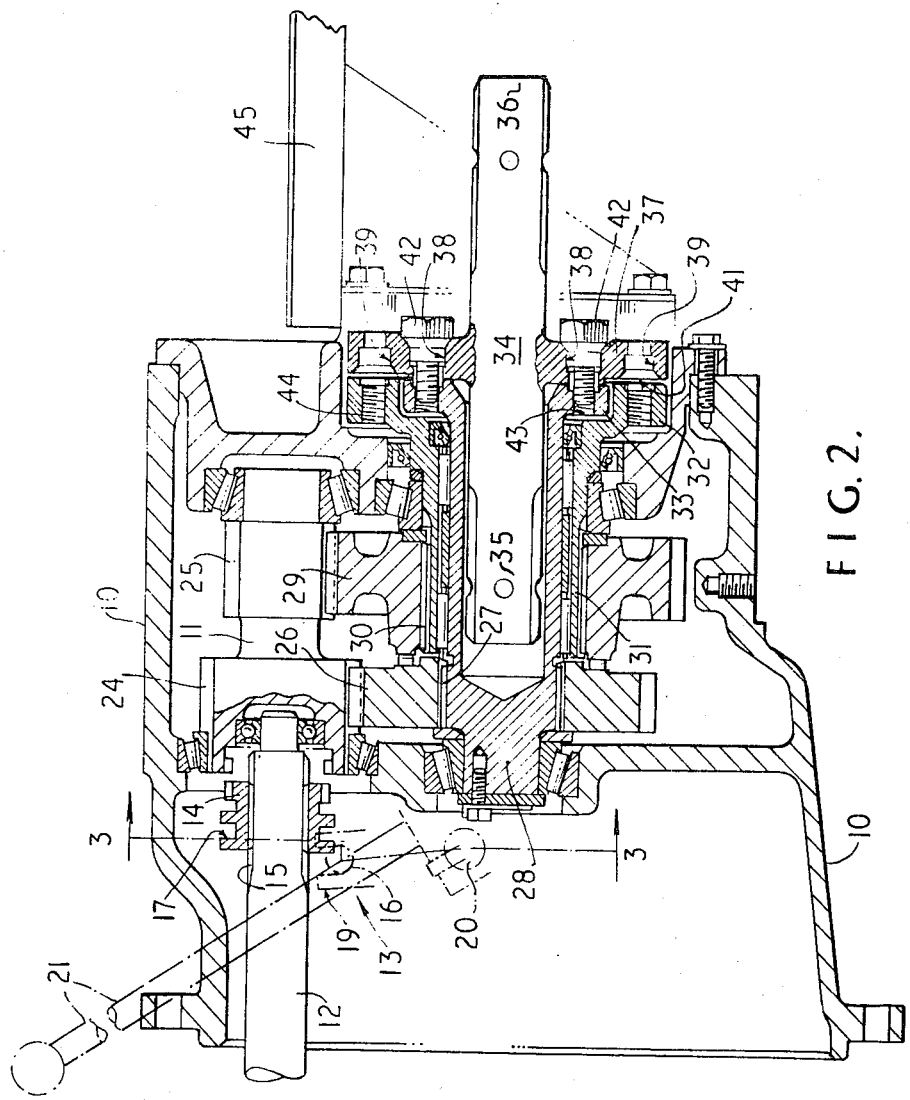
FIG. 2 is an elevation identical to FIG. 1 except that the power take-off shaft is shown turned end-for-end and thus arranged to rotate at 1000 revolutions per minute and to present twenty-one splines to equipment to be driven thereby.
Figure 3:
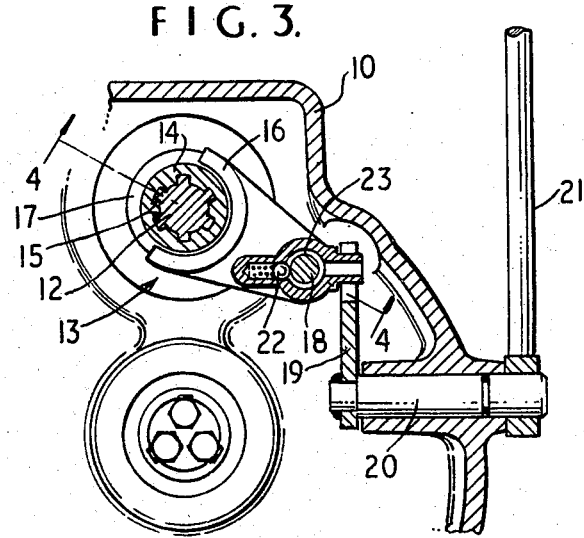
FIG. 3 is a section on the line 3—3 in FIGS. 1 and 2.

When the power take-off shaft 34 is required to rotate at a speed of 1000 revolutions per minute with its twenty-one-splined end zone 36 projecting operatively, the set of bolts 42 is removed from the outer circle of holes 39 in its flange 37, said shaft is turned end-for-end so as to insert its six-splined end zone 35 into the hollow drive shaft 28, and the set of bolts 42 is passed through the inner circle of holes 38 in the flange 37 on the power take-off shaft 34 into engagement with the threaded holes 43 in the flange 33 on the hollow drive shaft 28 as shown in FIG. 2. With this alternative mode of assembly, the set of bolts 42 cannot be erroneously engaged in the threaded holes 44 in the flange 32 on the drive sleeve 31, as the counterbores in the outer circle of holes 39 in the flange 37 on the power take-off shaft 34 are now for the time being disposed at the inaccessible side of the last-mentioned flange adjacent the flange 32 on the drive sleeve 31 and therefore the bolts 42, due to being stepped, cannot pass sufficiently far through said outer circle of holes 39 to engage in the threaded holes 44 aligned therewith. The outer annular undercut 41 provides an axial clearance between the flange 37 on the power take-off shaft 34 and the flange 32 on the drive sleeve 31 which is rotating simultaneously but at a slower speed.

In a modification, the inner and outer annular undercuts 40 and 41 respectively on the flange 37 of the power take-off shaft 34 are dispensed with and clearance between said flange and the inoperative one of the flanges 32 and 33 is provided by a washer disposed on each of the bolts 42 between the flange 37 and that one of the flanges 32 and 33 to which the flange 37 is for the time being driveably secured.

I claim:

1. A power take-off shaft assembly comprising a hollow drive shaft rotatable at a first speed; a drive sleeve surrounding the hollow drive shaft and rotatable simultaneously at a second speed; a power take-off shaft provided with differently splined end zones each of which is adapted to fit within the hollow drive shaft, and with a flange between said zones; means providing for selective engagement of said flange with one of said hollow drive shaft or said drive sleeve and for preventing erroneous engagement of said flange with either both of said drive shaft and said drive sleeve or with the wrong one of said drive shaft and said drive sleeve, comprising an inner circle of equally spaced holes step counterbored at the other side of the flange and a set of stepped bolts, each being matingly interfittable in said step counterbored holes and adapted driveably to secure the power take-off shaft to the hollow drive shaft when passed through the inner circle of holes from said one side of the flange, so that the splined end zone of the power take-off shaft appropriate to the speed of the hollow drive shaft projects operatively, and adapted driveably to secure the power take-off shaft to the drive sleeve when passed through the outer circle of holes from said other side of the flange, the power take-off shaft having been turned end-for-end so that its splined end zone appropriate to the speed of the drive sleeve then projects operatively each of said bolts having a length dimension insufficient to engage one of said drive sleeve said drive shaft when incorrectly inserted, whereby attempted insertion of a bolt into a hole not counterbored on a side of the flange into which such insertion is attempted leaves said bolt short of possible engagement with one of said drive shaft or said drive sleeve; and means for providing a clearance between the flange and that one of the hollow drive shaft and the drive sleeve to which the power takeoff shaft is not for the time being driveably secured.

2. A power take-off shaft assembly according to claim 1, wherein the means for providing a clearance comprise an inner annular undercut at said one side of the flange and an outer annular undercut at said other side of the flange.

3. A power take-off shaft assembly according to claim 1, wherein the means for providing a clearance comprise a washer disposed on each of the bolts between the flange and that one of the hollow drive shaft and the drive sleeve to which the power take-off shaft is for the time being driveably secured.

4. A power take-off shaft assembly according to claim 1, wherein gears of different pirch circle diameters are driveably secured to the hollow drive shaft and the drive sleeve respectively, and each of said gears meshes constantly with a gear integral with a countershaft to which a power input shaft is capable of being driveably connected.

5. A power take-off shaft assembly according to claim 4, wherein the power input shaft is driveably connectible to an engine by a disengageable friction clutch, and to the countershaft by a disengageable dog clutch.

* * * * *